INVENTOR.
ROY E. PRYOR
BY J. Warren Kinney, Jr.
ATTORNEY

Nov. 10, 1970 R. E. PRYOR 3,539,781
NUMERICAL SEQUENCE COMPUTER
Filed Jan. 15, 1968 3 Sheets-Sheet 2
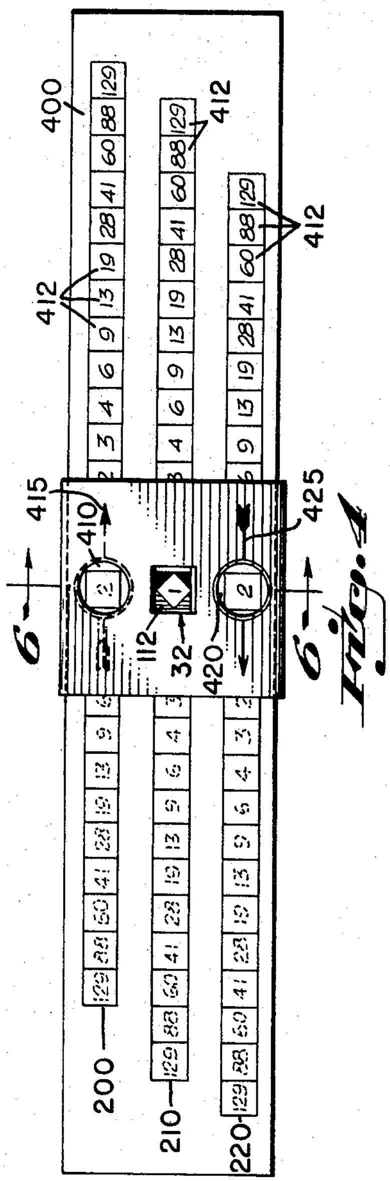
FIG. 4
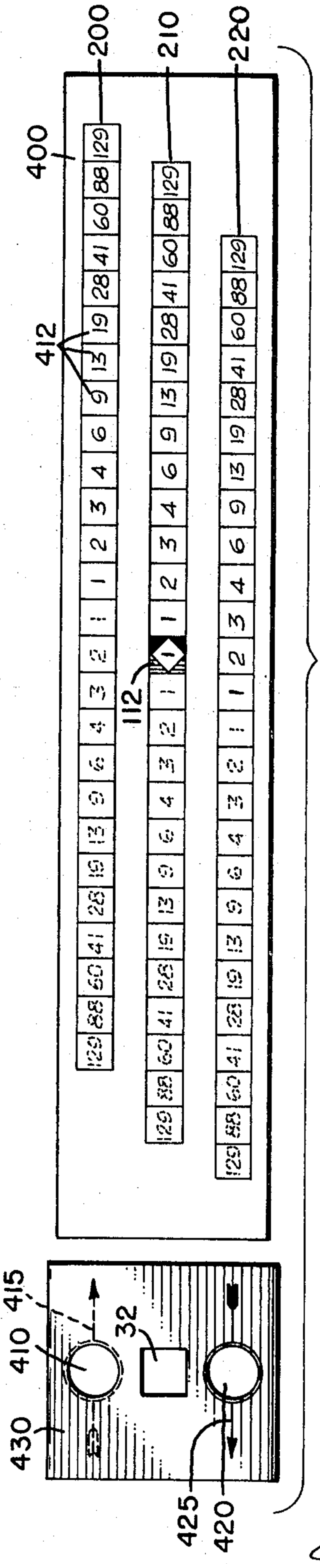
FIG. 5
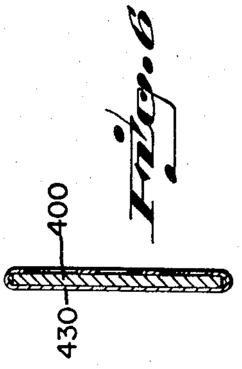
INVENTOR.
ROY E. PRYOR
BY J. Warren Kinney, Jr.
ATTORNEY Nov. 10, 1970 R. E. PRYOR 3,539,781

NUMERICAL SEQUENCE COMPUTER

Filed Jan. 15, 1968 3 Sheets-Sheet 3

INVENTOR.
ROY E. PRYOR

BY J. Warren Kinney, Jr.
ATTORNEY 3,539,781
NUMERICAL SEQUENCE COMPUTER
Roy E. Pryor, 8301 Cincinnati-Dayton Road, Westchester, Ohio 45069
Filed Jan. 15, 1968, Ser. No. 697,748
Int. Cl. G06c 3/00, 27/00; G09g 1/02
U.S. Cl. 235—88 28 Claims

ABSTRACT OF THE DISCLOSURE

A compact, numerical sequence computer having duplicate sequences of colored numerals on one member arranged relative to and on opposite sides of a central reference area, and having a window and associated apertures in a second member arranged to selectively dispose a number and a color of the first member in the window of the second member for indicating the unit amount of the next wager and the color upon which the wager should be placed.

This invention relates to a numerical sequence computer, and in particular to a compact, inexpensive lightweight, portable device.

An object of the invention is to provide a computer having duplicate sequences of numerals arranged in ascending order relative to unity and on opposite sides of a central or intermediate area in conjunction with an apertured cover member movable relative thereto, whereby the device may be utilized as an aid for players of games of chance which pay money to winners.

A further object of the invention is to provide a simple and inexpensive device having the hereinabove described characteristics, which is designed to establish a pattern of betting in connection with certain types of games of chance, which usually favors the user of the device with winnings exceeding losses during an extended period of play.

These and other objects are attained by the means described herein and as disclosed in the attached drawings in which:

FIG. 4 is a top plan view of a modified form of computer embodying the teachings of the present invention.

FIG. 5 is an exploded view of the two members comprising the computer of FIG. 4.

FIG. 6 is a sectional view taken on line 6—6 of FIG. 4.

Broadly considered, the subject device comprises a first, or indicia-bearing intermediate member 10, and a second or cover member 12 having openings therein in certain relationship with indicia of the first member.

Figure 1:
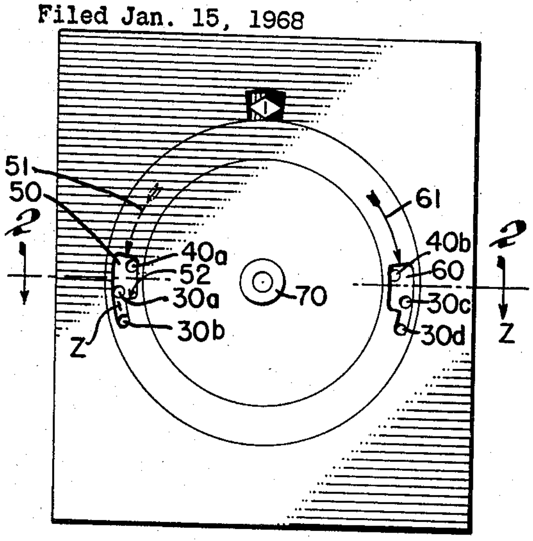
FIG. 1 is a top plan view of a computer embodying the teachings of the present invention.
Figure 2:
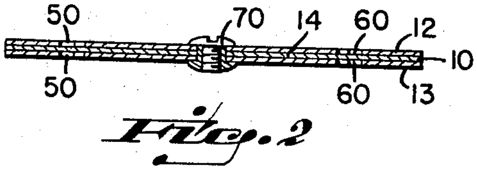
FIG. 2 is a sectional view taken on line 2—2 of FIG. 1.
Figure 3:
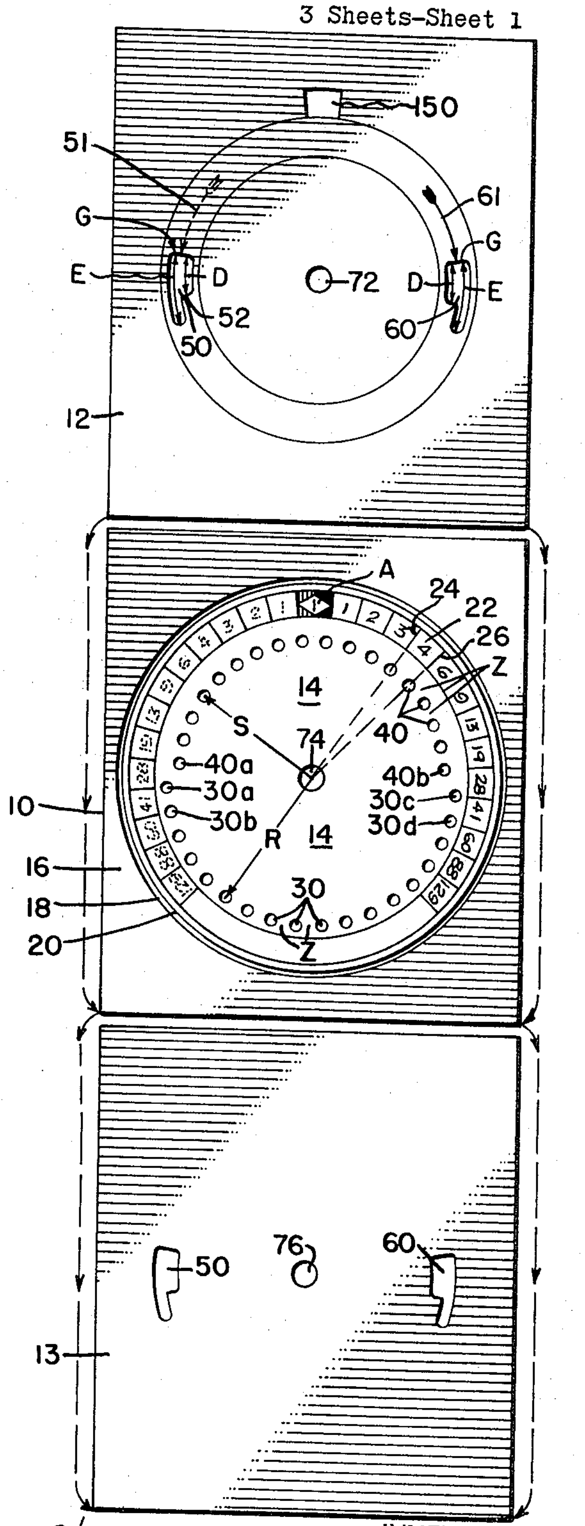
FIG. 3 is an exploded plan view illustrating the component parts of the device of FIG. 1.

In FIGS. 1–3 the first or indicia bearing member is in the form of a circular disc 14 excised from a substantially rectangular blank 16 by through cuts 18 and 20. The perimeter-adjacent portion of the disc is subdivided into a plurality of areas 22 of equal width by radial lines two of which are indicated by the numerals 24 and 26 for purpose of illustration.

Duplicate series of numerals are imprinted in certain of said areas on opposite sides of a central, start or reference area A in ascending order relative to unity. The numerals comprising each of said sequences are preferably of a different color, such as red and black, or of the same color but on a red and black background. By way of example, those numerals in solid outline will hereinafter be considered black, and those in broken outline red.

The two most important features of the invention reside in the fact that:

(1) the relationship of the numerals of each sequence is such that the sum of any selected three consecutively higher numbers is equal to the sum of the fourth consecutive number added to the second number of the three selected and, (2) a mechanical relationship between component parts of the computer, which will, when operated, present these sequential numbers in the order stated. By way of example, it will be noted that the sum of the first three consecutive higher numbers of a sequence, 1, 2 and 3, is 6, and the sum of the fourth consecutive number, 4, added to the second number, 2, is also 6, etc., if said number 1 is used as a starting point three consecutive movements, of the computer scale, in one direction plus one movement in the opposite direction will present all five numbers in the order stated above.

With particular reference now to FIG. 3 it will be noted that the first member 10 is provided with two arcuate rows or sets of indexing holes 30 and 40, each located on a different radius of member 10. The center of each indexing hole lies on a radial line which defines one boundary of an area 22.

The indexing holes 30 of one set are disposed in a semi-circle having a radius R whereas the indexing holes of the other set 40 are on a semi circle having a radius S, wherein the length of radius S is less than that of radius R by an amount at least equal to the diameter of an indexing hole.

Those areas between adjacent indexing holes constitute indexing zones, denoted generally by the letter Z.

The second, or cover member 12, see FIG. 3, is provided with a first aperture or indicia window 150 dimensioned to selectively reveal but one of the areas 22 at a time of the first member 10.

The second or cover member is also provided with a pair of complementary indexing apertures 50 and 60, each of a maximal width at least equal to the radical span of holes 30 and 40.

Each indexing aperture has a lesser, inner length D and a greater, outer length E as measured from a common radial edge G; wherein the lesser, or inner lengths D are such as to expose one complete indexing zone Z including both of the adjacent index holes 40 which collectively define the zone. The greater or outer lengths E are such as to expose two adjacent indexing zones including the three consecutive indexing holes 30 which collectively define the two adjoining indexing zones.

The numeral 13 denotes a rear panel, similar in size to member 12 and having apertures 50 and 60 which coincide with and are identical to the indexing apertures 50 and 60 of the second or cover member 12.

Disc 14 is rotatably mounted relative to and between members 12 and 13 by means of a double headed stud rivet or the like 70 which passes through central openings 72, 74 and 76 of members 12, 14 and 13 respectively. In FIG. 2 those portions of panel 16 from which disc 14 is excised are suitably fixed between members 12 and 13, said portions serving as a spacer to permit substantially free rotation of disc 14.

With reference now to FIGS. 1 and 3, it will be noted that the central reference area A of the rotatable disc 14 may be aligned with window 150 of the second member or cover panel 12, at which time the first and last of the indexing holes 40*a* and 40*b* of the lesser radius S are disposed respectively at the upper end G of inner portion D of the indexing apertures 50 and 60; and the first two, 30*a*–30*b* and the last two, 30*c* and 30*d* of the indexing holes of the greater radius R are disposed in the lower half of the outer enlarged portion E of each of said apertures. This represents the "starting" position or relationship of the elements which collectively constitute the subject device.

The device is useful in playing any game of chance which pays even money for winning. Roulette, for example, is one such game, which pays even money for winning on red or black, odd or even, high or low. Let it be assumed by way of example and not restriction, that a player wishes to use the device in playing the red and black characters of roulette. He will first normalize the computer by placing it in the "starting" position above mentioned, that is, the central reference area or starting character A of disc 14 will be visible in a window or aperture 150.

The player now places his wager of one unit on the roulette table, selecting either a red or black space at his option. The roulette wheel may then be spun, and will necessarily stop on either red, black, 0 or 00.

The disc 14 is then rotated using the index (red or black) which matches the color (red or black) which the wheel stops on. Note: If the wheel stops on zero or double zero the wager is lost, therefore it can be imagined that the wheel stopped on a color that would produce a loss, use this imaginary color to dial the next number. If it be assumed that the wheel stops on red, a pointer, pencil point, or other suitable instrument not illustrated, would be inserted into the top hole of the red index which in the device disclosed would be on the left side of FIG. 1, and the disc would then be rotated in the counter-clockwise direction indicated by the red arrow 51 until the pointer contacts stop 52 of indexing aperture 50. The disc thereupon will expose a black numeral 1 in window 150. The numeral 1 so appearing in window 150 indicates to the player the number of money units which should next be wagered on "black."

It should be noted that the aforesaid counterclockwise rotation of the disc will locate within the aperture 60, three consecutive holes of the larger radius row of holes 30. These three holes define two indexing zones, Z—Z, disposed in the outer portion E of index aperture 60.

If "red" should next come up on the roulette wheel, the player will again rotate disc 14 one step in a counterclockwise direction indicated by red arrow 51, for advancing a black numeral 2 into registry with window 150, thereby calling for a subsequent wager of 2 money units on "black." Assuming now that the third spin of the wheel turns up "black," the player would then insert a suitable instrument into the uppermost hole exposed in indexing aperture 60, and then rotate the disc as far as possible in a clockwise direction as indicated by the black arrow 61. This produces rotation of the disc in clockwise direction through two indexing zones, which will again present the central reference area A in window 150.

The player may now proceed as before, placing his wager of one money unit on either red or black and the next turn of the wheel will then determine whether the disc should be rotated in the direction of the black arrow 61 or the red arrow 51.

From the foregoing it will be noted that a basic concept of the subject device resides in providing means for advancing by one number in the sequence of numerals whenever a wager is lost, and of returning by two numbers, the numbers of said sequence relative to a window, whenever the wager is won.

Figures 7, 8, 9:
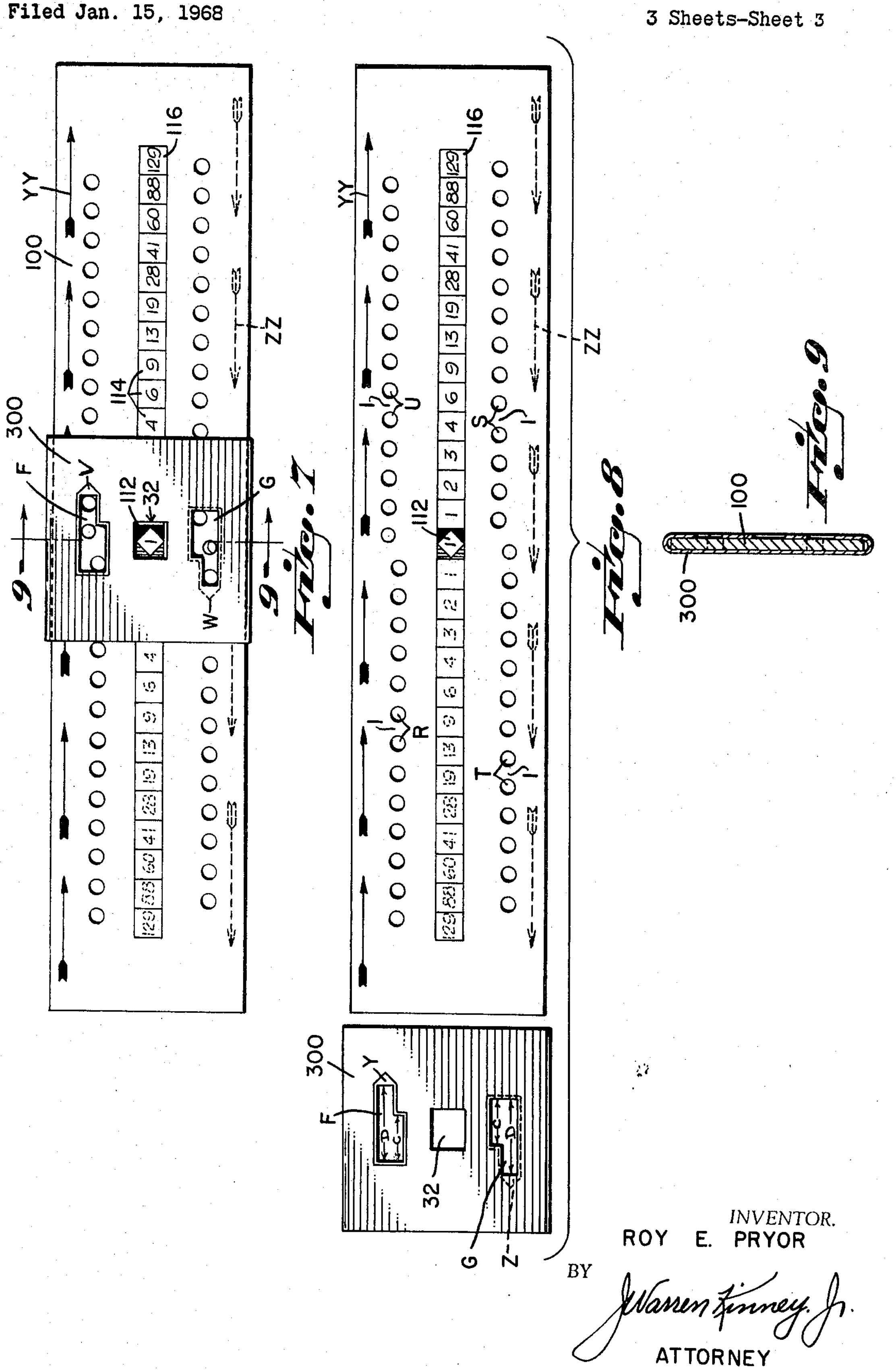
FIG. 7 is a plan view of a second modified form of the subject invention.
FIG. 8 is an exploded view of the two members comprising the device of FIG. 7.
FIG. 9 is a sectional view taken on line 9—9 of FIG. 7.

With particular reference now to FIGS. 7 and 8, the numeral 100 denotes a first member preferably in the form of a flat strip, having a series of equally spaced areas 114 containing a sequence of numerals in ascending relationship relative to a central reference area 112. Here also, the sum of any three consecutively higher numbers of a sequence is equal to the sum of the fourth consecutive number and the second number of that sequence.

It will be noted that four lines or rows of spaced holes are provided, two being defined by letters R and S and two by the letters T and U. The holes of rows R and S are on an axis which is offset inwardly of the axis of the holes in rows T and U, by an amount approximating a diametrical dimension of a hole. Each pair of adjacent holes defines an indexing zone I.

The second or cover member 300 is provided with a centrally disposed aperture or window 32, and a pair of indexing apertures F and G each of which comprises an elongate inner portion C which is of a lesser length than outer portion D. The length of outer portions D are such as to expose two complete indexing zones I as defined by three consecutive holes T or U; whereas the inner portion C of indexing apertures F and G are of such a length as to expose only one indexing zone I as defined by two adjacent holes R or S respectively.

Member 300 is adapted for lengthwise sliding movement on and relative to first member 100, it being noted that indexing aperture F and those numerals in solid outline are black whereas indexing aperture G and those numerals in broken outline are red, or some other contrasting color.

The outer ends of the indexing apertures F and G may be provided with suitable indicia V and W for indicating the direction in which the first member 100 should be moved relative to the second member 300 whenever a "red" or "black" move is called for. V and W may be markings in the form of arrow points or heads outlining the indexing apertures F and G, and as in the case of the arrows 51 and 61 of FIGS. 1, 2 and 3, the markings are of different colors. The headed arrows Y, Y and Z, Z on member 100 may be provided, if desired, to further indicate the relative direction of movement which should occur between members 100 and 300 incident to use of the device in playing of a game.

In the modification disclosed in FIGS. 7–9, I accomplish the same results which I obtain in operation of the devices illustrated in FIGS. 1–3.

With particular reference now to FIGS. 4 and 5 it will be noted that three rows of equal areas 200, 210 and 220, have been provided wherein the center row 210 is identical in all respects with the central indicia bearing portion 116 of member 100 of FIGS. 7 and 8.

The upper row 200 and low row 220 are similar to the center row 210 except for the fact that in rows 200 and 220, the central reference area 112 has been omitted, and the upper row 200 has been displaced to the right and the lower row 220 has been displaced to the left relative to the center row 210 whereby the red 2 (in broken outline) of the upper row 200 and the black 2 (in solid outline) of the lower row 220 are disposed in vertical alignment with the central reference area 112 of the middle or intermediate row 210. The numeral 400 denotes generally a first member or strip upon which the three rows of areas 412 of equal width are printed, and wherein each of said areas 412 is provided with one numeral of a sequence of numerals wherein the sum of any selected three consecutively higher numbers of a sequence is equal to the sum of the fourth consecutive number and the second number of said selected three numbers.

The numeral 430 denotes a second member having a window 32 therein dimensioned to expose one of the indicia containing areas 412 of row 210. Indexing apertures 410 and 420, disposed in substantially vertical alignment with window 32, are dimensioned to expose the numerals appearing in rows 200 and 220, respectively.

In this modified form of the subject invention the numeral appearing in window 32 determines the unit amount and the color of each wager, and the indexing apertures 410 and 420 are used to determine direction and distance member 430 will be moved for the next wager.

When this modified form of the subject invention is used. first normalize the computer by placing the central reference area 112 in window 32 and place the first wager of one unit on either red or black. If it be assumed that the first wager is placed on black and that the wheel stopped on red, slider 420 is moved to the right, in the direction indicated by red arrow 415, until the black numeral 1 appears in index aperture 410 and the next wager in this case, a black numeral 2, will then appear in window 32, indicating that the player should wager two units on "black."

If the wheel should again stop on red, the slider is advanced to the right in the direction of the red arrow, until the black numeral 2 appears in the aperture 410, at which time a black number 3 would be framed in window 32 indicating a wager of three units on "black."

If it is assumed the next number the wheel stops on is "black," the slider 430 is moved to the left, in the direction of the black arrow 425 until the black numeral 3 appears in index aperture 420. This will necessitate movement of the slider by two areas 412, at which time a black numeral 1 of row 210 will appear in window 32, thereby indicating that a single unit should be wagered on "black." It should be noted that, in each case, the slider is moved in the direction indicated by arrow 415 or 425 that corresponds with the color the wheel stopped on, and it is moved in that direction, until the preceding wager (amount and color) appears in indexing aperture 410 or 420 to correspond with the direction of movement.

While I have utilized red or black in the game of roulette as an example in the instant explanation, it should be understood that the subject computer may be used to the same advantage in playing odd or even, high or low, combinations on the roulette tables or any other game having similar combinations and which pays even money for winning.

The numerals and boxes therefor visible in the windows of the second member in each instance, may be printed or otherwise applied to the first member, and both of said members in an inexpensive version of the device may be formed of cardboard or the like. The simplest constructions, FIGS. 4 and 7, comprise only two parts, one of which is movable relative to the other. In the more sophisticated construction of FIGS. 1, 2 and 3, are employed only five simple and inexpensive parts, including the rivet 70. The devices might of course be constructed of metal, plastic, or other suitable materials.

It should be understood that various changes and modifications may be made in the structural details of the device within the scope of the appended claims without departing from the spirit of the invention.

What is claimed is:

1. A numerical sequence computer comprising in combination:

(a) a first one-piece member having a surface, a portion of said surface subdivided into a plurality of indicia areas of equal width, and a plurality of indexing means on said first member adjacent to said areas, two sequences of numerals in ascending order applied in said areas, the sequences beginning with unity and progressing in value in opposite directions from a central reference area on said first member, where in each sequence the sum of any three consecutively higher numerals is equal to the sum of the fourth consecutive numeral added to the second numeral of said three, (b) a second member movable relative to said first member and having (1) a window dimensioned to expose selectively, upon relative movement of said members, one of the numerals of an indicia area of said first member, and (2) a pair of indexing apertures in said second member on opposite sides of said window and each dimensioned to expose an indexing means of the first member, and (c) means interconnecting said first and second members against physical separation in various positions of relative movement thereof.

2. The computer as specified by claim 1, wherein said indexing means on the first member are cooperative with portions of the indexing apertures of the second member, for determining the extent of successive relative movements of said members.

3. The computer as specified by claim 1, wherein the indexing means on said first member comprises two rows of equally spaced implement-receptive holes, the center of each of which lies on a line defining one boundary on an indexing zone, said rows of holes being offset laterally from one another, and said indexing apertures being of sufficient width to expose the holes of both said rows.

4. The computer as specified by claim 3, wherein each indexing aperture is characterized by two sections of different length dimensions, the shorter section of each indexing aperture being dimensioned to expose two holes of one row of holes, and the longer section of each indexing aperture being dimensioned to expose three holes of the remaining row of holes.

5. The computer as specified by claim 1, wherein the first member is in the form of a circular disc whose center is located at the interconnecting means aforesaid and wherein the indicia areas are arranged upon a circle arc at equal distances from the disc center.

6. The computer as specified by claim 1, wherein the indexing means comprise indexing zones defined by holes in said first member, said holes being spaced equal distances apart and exposable through the indexing apertures of the second member.

7. A numerical sequence computer comprising in combination:

(a) a first one-piece member having a surface, a portion of said surface subdivided into a plurality of indicia areas of equal width, and a plurality of holes in said first member defining therebetween a plurality of indexing zones adjacent to said areas, two sequences of numerals in ascending order applied in said areas, the sequences beginning with unity and progressing in value in opposite directions from a central reference area on said first member, where in each sequence the sum of any three consecutively higher numerals is equal to the sum of the fourth consecutive numeral added to the second numeral of said three, (b) a second member movable relative to said first member and having (1) a window dimensioned to expose selectively, upon relative movement of said members, one of the numerals of an indicia area of said first member, and (2) a pair of indexing apertures in said second member on opposite sides of said window and each dimensioned to expose an indexing zone of the first member, and (c) means interconnecting said first and second members against physical separation in various positions of relative movement thereof.

8. The computer as specified by claim 7, wherein the first member is in the form of an elongate strip bearing said indicia areas, numerical sequences, and indexing zones, and wherein said second member is in the form of a slider movable lengthwise of the strip and carrying said window and said indexing apertures.

9. The computer as specified by claim 8, wherein said holes are arranged on said strip in rows of equally spaced implement-receptive holes, the spacings of which are equal to the length dimension of an indexing zone, said rows of holes being offset laterally from one another, and said indexing apertures being of sufficient width to expose the holes of both said rows.

10. The computer as specified by claim 9, wherein each indexing aperture is characterized by two sections of different length dimensions, the shorter section of each indexing aperture being dimensioned to expose two holes of one row of holes and the longer section of each indexing aperture being dimensioned to expose three holes of the remaining row of holes.

11. The computer as specified by claim 10, wherein the indexing apertures are formed in the slider on opposite sides at substantially equal distances from the window of the slider.

12. The computer as specified by claim 11, wherein the two sequences of numerals are arranged in a single straight line parallel to the major axis of the elongate strip, and the rows of holes aforesaid are arranged in straight lines at opposite sides of said major axis.

13. The computer as specified by claim 10, wherein the center of the holes of a row are spaced apart a distance equal to the width of an indicia area.

14. A numerical sequence computer comprising in combination:

(a) an elongage strip member having a surface a portion of which is subdivided into three spaced rows of indicia areas, said areas being of equal width, and a first, a second, and a third set of numerals, each of said sets comprising two sequences of numerals in ascending order applied to a row of indicia areas, said sequences beginning with unity and progressing in value in opposite directions from a central point, and where in each sequence the sum of any three consecutively higher numerals is equal to the sum of the fourth consecutive numeral added to the second numeral of said three; said first and third sets of numerals being arranged to flank the second set at opposite sides of the latter, and all of said sets being spaced from each other in parallelism with the major axis of the strip; said second set having a central reference area occupying an indicia area intermediate the two sequences of numerals comprising said second set; the first set of numerals having a first number of a sequence offset in one longitudinal direction, and the third set of numerals having a first number of a sequence offset in the opposite longitudinal direction;

(b) a slider mounted upon said strip member for shifting movement lengthwise of said strip member, and having (1) a window located and dimensioned to expose selectively, upon shifting of the slider, the central reference area or a numeral of the second set of numerals, and (2) a pair of apertures in said slider flanking said window, located and dimensioned to expose within said apertures a numeral of each of the first and third set of numerals aforesaid.

15. The computer as specified by claim 14, wherein the numerals of one sequence of each row are red and the numerals of the other sequence of each row are black.

16. The computer as specified by claim 14, wherein the first set of numerals is offset to the right placing the red numeral 2 in vertical alignment with a central reference area of the second set of numerals, and the third set of numerals is offset to the left placing the black 2 in vertical alignment with said central reference area.

17. The computer as specified by claim 14, wherein said window and said apertures of the slider are disposed in a line which is transverse to the direction of shifting movement of the slider.

18. A numerical sequence computer comprising in combination:

(a) a first member having a surface, a portion of said surface subdivided into a plurality of indicia areas of equal width, and a plurality of holes in said first member defining therebetween a plurality of indexing zones adjacent to said areas, two sequences of numerals in ascending order applied in said areas, the sequences beginning with unity and progressing in value in opposite directions from a central reference area on said first member, where in each sequence the sum of any three consecutively higher numerals is equal to the sum of the fourth consecutive numeral added to the second numeral of said three, (b) a second member movable relative to said first member and having (1) a window dimensioned to expose selectively, upon relative movement of said members, one of the numerals on an indicia area of said first member, and (2) a pair of indexing apertures in said second member dimensioned to expose at least one indexing zone of the first member, (c) said holes in said first member arranged in two rows of equally spaced implement-receptive holes, the center of each of which lies on a line defining one boundary of an indexing zone, said rows of holes being offset laterally from one another, and said indexing apertures being of sufficient width to expose the holes of both said rows, each indexing aperture characterized by two sections of different length dimensions, the shorter section of each indexing aperture being dimensioned to expose two holes of one row of holes, and the longer section of each indexing aperture being dimensioned to expose three holes of the remaining row of holes, said indexing apertures formed in the second member on opposite sides at substantially equal distances from the window of said second member, and (d) means interconnecting said first and second members against physical separation in various positions of relative movement thereof.

19. A numerical sequence computer comprising in combination:

(a) a first member having a surface, a portion of said surface subdivided into a plurality of indicia areas of equal width, and a plurality of holes in said first member defining therebetween a plurality of indexing zones adjacent to said areas, two sequences of numerals in ascending order applied in said areas, the sequences beginning with unity and progressing in value in opposite directions from a central reference area on said first member, where in each sequence the sum of any three consecutively higher numerals is equal to the sum of the fourth consecutive numeral added to the second numeral of said three, (b) a second member movable relative to said first member and having (1) a window dimensioned to expose selectively, upon relative movement of said members, one of the numerals on an indicia area of said first member, and (2) a pair of indexing apertures in said second member dimensioned to expose at least one indexing zone of the first member, (c) said holes in said first member arranged in two rows of equally spaced implement-receptive holes, the center of each of which lies on a line defining one boundary of an indexing zone, said rows of holes being offset laterally from one another, and said indexing apertures being of sufficient width to expose the holes of both said rows, (d) means interconnecting said first and second members against physical separation in various positions of relative movement thereof, and (e) said first member in the form of a circular disc whose center is located at the interconnecting means aforesaid, and wherein said laterally offset rows of holes lie on circle arcs at different radial distances from the center of the disc.

20. The computer as specified by claim 19 wherein all the holes of one row are disposed to one side of a diameter of the disc, and all the holes of the remaining row are disposed to the opposite side of said diameter.

21. The computer as specified by claim 20, wherein opposite ends of said rows of holes are substantially equidistant from the window of said second member, and said end holes register with both of the indexing apertures aforesaid, when the central reference area is in registry with said window.

22. The computer as specified by claim 20, wherein the holes of both rows are equal in number.

23. A numerical sequence computer comprising in combination:

(a) a first member having a surface, a portion of said surface subdivided into a plurality of indicia areas of equal width, and a plurality of holes in said first member defining therebetween a plurality of indexing zones adjacent to said areas, two sequences of numerals in ascending order applied in said areas, the sequences beginning with unity and progressing in value in opposite directions from a central reference area on said first member, where in each sequence the sum of any three consecutively higher numerals is equal to the sum of the fourth consecutive numeral added to the second numeral of said three, (b) a second member movable relative to said first member and having (1) a window dimensioned to expose selectively, upon relative movement of said members, one of the numerals on an indicia area of said first member, and (2) a pair of indexing apertures in said second member dimensioned to expose at least one indexing zone of the first member, (c) said holes in said first member arranged in two rows of equally spaced implement-receptive holes, the center of each of which lies on a line defining one boundary of an indexing zone, said rows of holes being offset laterally from one another, and said indexing apertures being of sufficient width to expose the holes of both said rows, each indexing aperture characterized by two sections of different length dimensions, the shorter section of each indexing aperture benig dimensioned to expose two holes of one row of holes, and the longer section of each indexing aperture being dimensioned to expose three holes of the remaining row of holes, (d) means interconnecting said first and second members against physical separation in various positions of relative movement thereof, and (e) said first member in the form of a circular disc whose center is located at the interconnecting means aforesaid, and wherein the indicia areas are arranged upon a circle arc at equal distances from the disc center.

24. The computer as specified by claim 23, wherein said laterally offset rows of holes lie on circle arcs at different radial distances from the center of the disc.

25. The computer as specified by claim 24 wherein said holes in said first member defining said indexing zones are spaced equal distances apart and exposable through the indexing apertures of the second member.

26. A numerical sequence computer comprising in combination:

(a) a first member having a surface, a portion of said surface subdivided into a plurality of indicia areas of equal width, and a plurality of holes in said first member defining therebetween a plurality of indexing zones adjacent to said areas, two sequences of numerals in ascending order applied in said areas, the sequences beginning with unity and progressing in value in opposite directions from a central reference area on said first member, wherein each sequence the sum of any three consecutively higher numerals is equal to the sum of the fourth consecutive numeral added to the second numeral of said three, (b) a second member movable relative to said first member and having (1) a window dimensioned to expose selectively upon relative movement of said members, one of the numerals on an indicia area of said first member, and (2) a pair of indexing apertures in said second member dimensioned to expose at least one indexing zone of the first member, (c) said first member in the form of a circular disc with the two sequences of numerals disposed on said first member on an arc, said first member containing a hole for each of said numerals, said holes located on an arc radially inwardly of said numerals, said pair of apertures diametrically aligned and disposed 90° on opposite sides of said window through said second member, said pair of apertures in alignment with and each exposing at least two of the holes in said first member, and (d) means interconnecting said first and second members against physical separation in various positions of relative movement thereof.

27. A numerical sequence computer comprising in combination:

(a) a first member having a surface, a portion of said surface subdivided into a plurality of indicia areas of equal width, and a plurality of holes in said first member defining therebetween a plurality of indexing zones adjacent to said areas, two sequences of numerals in ascending order applied in said areas, the sequences beginning with unity and progressing in value in opposite directions from a central reference area on said first member, where in each sequence the sum of any three consecutively higher numerals is equal to the sum of the fourth consecutive numeral added to the second numeral of said three, (b) a second member movable relative to said first member and having (1) a window dimensioned to expose selectively upon relative movement of said members, one of the numerals on an indicia area of said first member, and (2) a pair of indexing apertures in said second member dimensioned to expose at least one indexing zone of the first member, (c) said indexing apertures in the second member bearing a relationship to the indexing zones of the first member such that but one indexing zone will be exposed through one of the indexing apertures of said pair whenever the number of one or the numbe of one or the other of said two sequences is exposed through the window of the second member, whereas two adjacent indexing zones will be simultaneously exposed through the other indexing aperture, and whereby relative movement between the first and second members by the amount of the single indexing zone exposed in the first mentioned indexing aperture will advance the first member by the full width of one area to dispose the next higher number of that sequence originally in said aperture, and wherein relative movement between the first and second members in an opposite direction by the amount of the two indexing zones exposed in the second indexing aperture will advance the first member in the opposite direction by the full width of two areas to dispose the indicia appearing in said second area to the window of the second member, and (d) means interconnecting said first and second members against physical separation in various positions of relative movement thereof.

28. A numerical sequence computer comprising in combination:

(a) a first member having a surface, a portion of said surface subdivided into a plurality of indicia areas of equal width, and a plurality of holes in said first member defining therebetween a plurality of indexing zones adjacent to said areas, two sequences of numerals in ascending order applied in said areas, the sequences beginning with unity and progressing in value in opposite directions from a central reference area on said first member, where in each sequence the sum of any three consecutively higher numerals is equal to the sum of the fourth consecutive numeral added to the second numeral of said three, (b) a second member movable relative to said first member and having (1) a window dimensioned to expose selectively, upon relative movement of said members, one of the numerals on an indicia area of said first member, and (2) a pair of indexing apertures in said second member dimensioned to expose at least one indexing zone of the first member, (c) said first member in the form of a circular disc with the reference area and said sequences of numerals disposed on an arc on the disc, said holes in said first member located on an arc radially inwardly of said numerals, said pair of apertures in said second member diametrically aligned and disposed on opposite sides of the window through said second member and in alignment with and overlying the holes in said first member, and (d) means interconnecting said first and second members against physical separation in various positions of relative movement thereof.

References Cited

UNITED STATES PATENTS

| | | | |
|---|---|---|---|
| 435,718 | 9/1890 | Tewksbury | 235—88 |
| 845,276 | 2/1907 | Swart | 235—78 |
| 1,487,069 | 3/1924 | Ladenberger | 235—78 |
| 1,694,877 | 12/1928 | Hutchings | 235—78 |
| 2,058,496 | 10/1936 | Paul | 235—78 X |

RICHARD B. WILKINSON, Primary Examiner

S. A. WAL, Assistant Examiner

U.S. Cl. X.R.

235—70, 88